Figure 1:
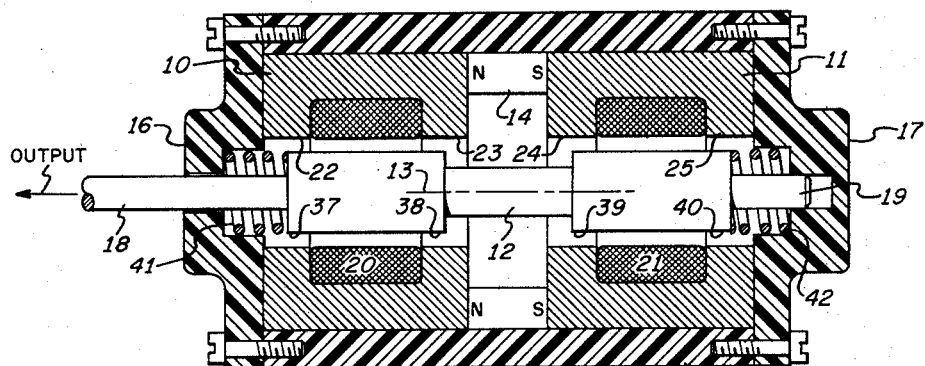

Jan. 28, 1964 R. H. PETTIT ETAL 3,119,940
MAGNETOMOTIVE ACTUATORS OF THE RECTILINEAR OUTPUT TYPE
Filed May 16, 1961 2 Sheets-Sheet 1

INVENTORS
ROBERT H. PETTIT
LAWRENCE A. SCHNECK
BY
ATTORNEY

Jan. 28, 1964   R. H. PETTIT ETAL   3,119,940
MAGNETOMOTIVE ACTUATORS OF THE RECTILINEAR OUTPUT TYPE
Filed May 16, 1961   2 Sheets-Sheet 2

INVENTORS
ROBERT H. PETTIT
LAWRENCE A. SCHNECK
BY
ATTORNEY

United States Patent Office 3,119,940
Patented Jan. 28, 1964

3,119,940
MAGNETOMOTIVE ACTUATORS OF THE RECTILINEAR OUTPUT TYPE
Robert H. Pettit, Huntington, and Lawrence A. Schneck, Hicksville, N.Y., assignors to Sperry Rand Corporation, Great Neck, N.Y., a corporation of Delaware
Filed May 16, 1961, Ser. No. 118,222
11 Claims. (Cl. 310—24)

This invention relates to a magnetomotive actuator of the rectilinear output type having a stator and an armature supported to move translationally with relation to the stator along an axis. The armature of the improved actuator includes four axially spaced polar terminals, the end pair of which cooperate with the stator to close one of the polarized magnetic circuits of the actuator. The intermediate pair of polar terminals cooperate with the stator to close the other of the polarized magnetic actuator circuits. The stator of the improved actuator includes an annular flux conductive member concentric to the axis of the armature having oppositely polarized ends. It also includes two electromagnets having axially spaced poles, one end of each of which is connected to one of the ends of the polarized member. The stator accordingly includes four magnetic poles that are spaced along the axis of the armature to cooperate with the respective end and intermediate polar terminals of the armature.

In accordance with the present invention, the axial polar arrangement of the components of the actuator provides related magnetic circuits whose individual and/or total reluctance may be made to change or remain substantially constant as the armature moves from its center position with relation to the end poles of the stator. A mechanical spring that centers the armature and reduces the net available force of the actuator is not essential to the combination. Such a spring is used, however, when the centering effort of the actuator per se is insufficient to return the armature to a center condition. It is also used where a linear stroke of the armature is desired for a given actuator input such as in servo valve operation. In this instance, the provided magnetic circuits both exert a displacing force on the armature and provide an increase in the total circuit reluctance depending on the displacement of the armature from a center condition. As armature displacement does not change the total reluctance of the included magnetic circuits in arrangements of the character where the total reluctance remains constant, the force exerted in the armature in such instances is solely dependent on the electrical input to the actuator. The output of the improved actuator is accordingly not dependent on the position of the armature with relation to its center condition. The improved actuator is accordingly also capable of producing a translational force output equivalen to that of an electric torque motor.

One of the features of the present invention resides in the provision of an actuator armature movable translationally along an axis having four axially spaced polar terminals.

Another feature of the invention resides in the actuator stator structure provided wherein an equal number of similarly spaced poles are arranged to cooperate with the poles of the armature to close two polarized magnetic circuits.

Other features and structural details of the invention will become apparent from the following description in connection with the accompanying drawings in which four embodiments of the improved actuator structure are shown.

Figure 2:
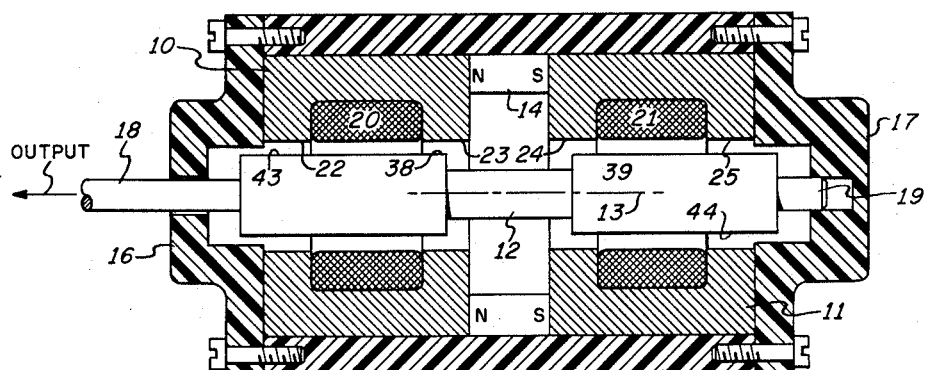
Figure 3:
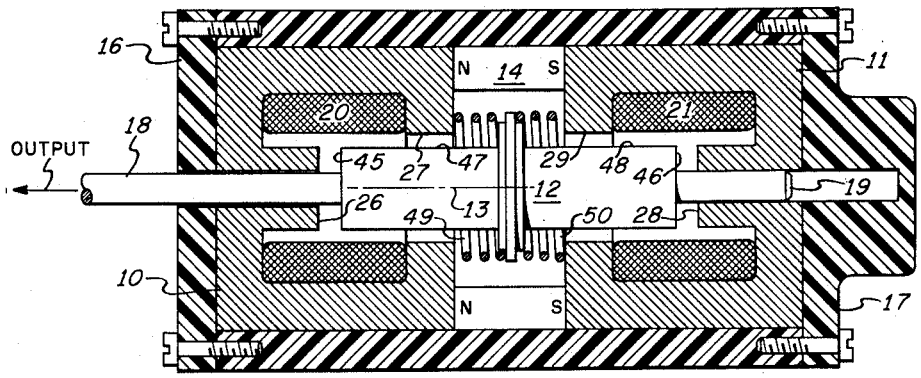
Figure 4:
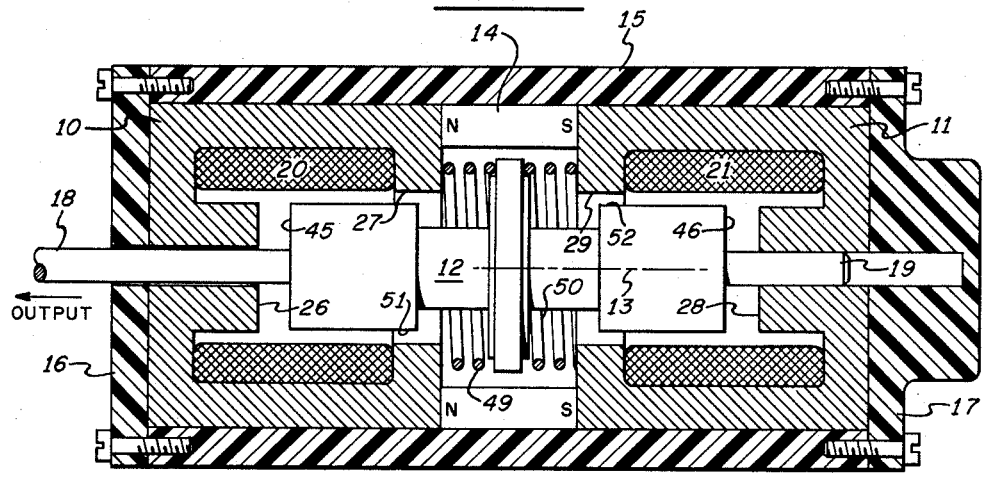
Figure 5:
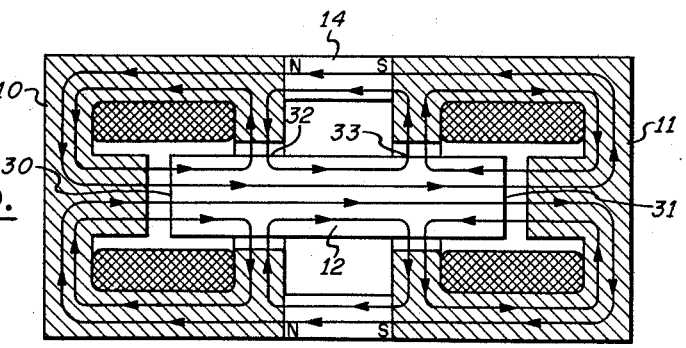
Figure 6:
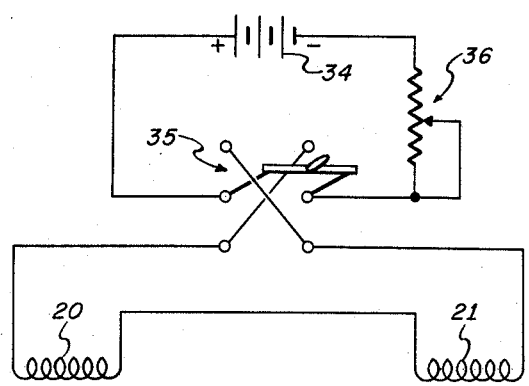

In the drawings:

FIG. 1 is a sectional view taken along the axis of the armature showing the polar embodiment of the improved actuator in which the total reluctance of the provided magnetic circuits remains constant with movement of the armature from a centered position, FIG. 2 is a view similar to FIG. 1 in which an embodiment of the improved actuator is shown where the reluctance of one of the provided magnetic circuits remains fixed as the armature translates from a center condition while the reluctance of the other of the provided magnetic circuits changes, FIG. 3 is a further view of similar character to FIG. 1, showing an arrangement where the first of the provided magnetic circuits changes its reluctance with displacement of the armature axially and the reluctance of the second of the magnetic circuits remains fixed, FIG. 4 is another view of similar character to FIG. 1, in which the total reluctance of the combined magnetic circuits provided changes as the armature moves from a centered position with relation to the poles of the stator, FIG. 5 is a schematic diagram showing the respective polarizing flux and control flux circuits of the improved actuator, and FIG. 6 is a circuit diagram connecting the coils of the stator of the improved actuator to a controlling source of electrical energy through a suitable reversing switch.

The elements common to the respective embodiments of the subject invention include an axially spaced pair of core members or pieces 10 and 11, an armature 12 supported to move translationally along an axis 13, and a polarizing piece or annular magnet 14 that connects the cores magnetically and is arranged in concentric relation to the axis 13. The noted essential components of the improved actuator structure are indicated by the same reference characters in the respective figures of the present application.

As shown in FIGS. 1 to 4, inclusive, the mounting frame provided for the actuator parts houses the stator and armature and includes the end bearings required to support the armature for movement along its axis 13. The frame illustrated includes a non-magnetic sleeve 15 with respective non-magnetic end plates 16 and 17 connected thereto. Stroke rod 18 transmits the output of the actuator to a suitable load, the same extending through the end plate 16 at the bearing provided thereon for the same and being connected at its interior end to one of the ends of the armature 12. A stub rod 19 cooperates with the coaxial bearing provided to support the armature in the opposite end plate 17. Rod 19 of the mounting arrangement is suitably connected to the other of the ends of the armature 12 in coaxial relation to the stroke rod 18.

The stator component of the improved actuator consists of a pair of electromagnets whose respective core pieces include windings 20 and 21 and the annular polarizing piece 14. In the embodiments of the invention shown in FIGS. 1 and 2, the arrangement of the core pieces on the frame is such that the cores present a U-shaped axial cross section having poles that are spaced with respect to one another along the axis 13, and that are concentric to the axis. In the embodiment of the invention shown in FIGS. 3 and 4, the cores are arranged in the frame to present an E-shaped axial cross section having axially spaced poles one of which is normal to the armature axis 13 and the other of which is concentric to the axis. Where all the poles of the stator are concentric to the axis 13, as shown in FIGS. 1 and 2, the arrangement provides four axially spaced ring gaps between the cores and the armature. Where two of the poles are normal to the axis and two of the poles are concentric to the axis as shown in FIGS. 3 and 4, the normal poles are arranged to provide end gaps and the concentric poles are axially spaced in an intermediate position between the end poles.

In the identical core structures of FIGS. 1 and 2, the axially spaced poles of the flux conducting core 10 are indicated at 22 and 23. The poles of the related core 11 are indicated at 24 and 25. The stator of the structure accordingly includes a first core with axially spaced first and second end poles and a second core with axially spaced third and fourth end poles. In the arrangement of the stator parts provided in the frame, the polarizing piece, member or magnet 14 polarizes the respective cores oppositely. As shown, piece 14 constitutes a spacing element between the cores 10 and 11, one of whose ends is connected to the core 10 at the pole 23 and the other of whose ends is connected to the core 11 at the pole 24. Polarizing piece 14 connects the cores 10 and 11 in spaced relation within the frame provided by the end plates 16, 17 and the sleeve 15.

In the stator structure shown in FIGS. 3 and 4, where the cores are of E-shaped axial cross section, the central leg of core 10 provides a first end pole 26 normal to the axis 13 and the outer leg of core 10 provides a first end pole 27 concentric to the axis 13. The central leg of corresponding core 11 provides a second end pole 28 normal to the axis and a second end pole 29 concentric to the axis. In this arrangement, one of the polar ends of the annular magnet 14 is held by the frame in connected relation to the outer leg of the core 10 while the other of the polar ends is similarly located in relation to the outer leg of the core 11.

As shown in FIG. 5, the armature 12 includes respective terminal poles 30 and 31 that are spaced from the end poles of the respective cores 10 and 11 by gaps. The other two poles 32 and 33 of the armature 12 are concentric to the axis 13 and cooperate with the respective intermediate poles provided on the spaced cores 10 and 11 in all of the embodiments of the invention shown in the drawings. The armature 12 and cores 10 and 11 of the described structure are polarized by the magnet 14 of the combination to provide a pair of magnetic circuits. As represented graphically by the flux lines in FIG. 5, the first of the circuits includes one end of magnet 14, the core 10, the end pole of the core 10, the gap between the core pole and the terminal pole 30 of the armature 12, the armature 12, the gap between the terminal pole 31 of the armature and the end pole of core 11, and core 11 to the other end of the magnet 14. The flux in this magnetic circuit flows through the armature 12 from end to end along the axis 13. The second of the provided polarized circuits includes one end of the magnet 14, the portion of the core 10 terminating at the intermediate pole of the core 10 to the gap between the core pole and the pole 32 of the armature, the portion of the armature 12 between the spaced intermediate poles 32 and 33, the gap between the armature pole 33 and the intermediate pole of the core 11, and the portion of the core 11 between the portion thereof terminating at the intermediate pole and the other end of the magnet 14.

The actuator is operated by exciting the windings 20 and 21 of the respective electromagnets differentially to provide oppositely directed control flux fields in the respective cores and armature portions indicated in FIG. 5. With the control flux lines directed as shown in FIG. 5, the flux field established in core 10 supplements the polarizing flux at the armature pole 30 and opposes the polarizing flux at the armature pole 32. With the core 11, the control flux lines oppose the polarizing flux at the terminal pole 31 of the armature and supplements the polarizing flux at the armature pole 33. The directed flux circuits produce the force required to translate the stroke rod of the motor to the left as viewed in FIG. 4. The extent of the axial movement of the armature depends on the relative size and arrangement of the poles of the motor, the strength of the magnet 14, the flux field lines provided by the input control means, and by suitable means such as springs, where used, that return the armature to a centered position with relation to the stator. Reversing the excitation provided by the electrical input means reverses the direction of translation of the armature. The illustrative input circuit provided to control the actuator shown in FIG. 6 includes a suitable source of electrical energy such as battery 34 that is connected to the series arranged windings 20 and 21 by way of a reversing switch 35 and a suitable potentiometer 36.

Where a force output is required of the actuator, the polar configuration of the cores and armatures, shown in FIG. 1, in which the total reluctance of the provided magnet circuits remains constant as the armature moves from a centered position, may be used. In this arrangement, the pole gap widths between the respective cores and armature remain fixed. In relation to core 10, as armature 12 moves to the left, the gap area between armature pole 37 and core pole 22 increases and the gap area between armature pole 38 and related core pole 23 correspondingly decreases. Similarly with relation to core 11, as the gap area between armature pole 39 and core pole 24 increases, the gap area between armature pole 40 and related core pole 25 decreases. Accordingly, the total reluctance of the described magnetic circuits remains fixed and the output of the stroke rod 18 represents a force that is proportional to the differential current input to the windings 20, 21 of the actuator. The force output of the actuator in this embodiment of the invention is independent of the position of the armature. The centering springs 41 and 42 provided for the armature 12 in FIG. 1 reduce the net available force output of the actuator. In this form of the invention all of the gaps provided are force producing.

In the embodiment of the invention shown in FIG. 2, the armature poles 38 and 39 are identical to those shown in FIG. 1. In this arrangement, the respective end armature poles 43 and 44 do not present a varying pole area to the respective core poles 22 and 25, so that the total reluctance of the provided magnet circuits changes as the armature moves. With regard to the first of the magnetic circuits, the reluctance remains constant as there is no change in gap area between the related armature pole 43, core pole 22 and armature pole 44 and core pole 25. The change occurs due to the change in the reluctance of the second magnetic circuit where one of the gap areas between the armature pole 38, core pole 23 and armature pole 39, core pole 24 increases while the other decreases. In this embodiment of the invention, the armature is self-centering upon removal of the operating excitation and accordingly requires no centering spring. The end gaps in this form of the invention are non-force producing.

The embodiments of the invention shown in FIGS. 3 and 4 produce a displacement output of the stroke rod 14 that is linear with the electrical input to the windings 20, 21. In FIG. 3 the total reluctance of the magnetic circuits is changed as required with displacement of the armature by the polar arrangement provided for only the first magnetic circuit. In FIG. 4, the axially spaced gaps provided are all force gaps and the total reluctance is increased as desired by changing the individual reluctances of both the provided magnetic circuits.

In FIG. 3, the terminal armature poles 45 and 46 are normal to the axis 13 and the intermediate poles 47, 48 are similar in character to the armature end poles 43, 44 shown in FIG. 2. Here as the armature moves, the gap width between the respective armature pole 45, core pole 26 and armature pole 46, core pole 28 varies to change the reluctance of the first magnetic circuit. There is no change in gap width or area between armature pole 47, core pole 27 and armature pole 48, core pole 29 so that there is no change in reluctance in the second magnetic circuit. The total reluctance of the circuits changes accordingly so that the stroke rod 18 is displaced as desired. Centering springs 49 and 50 are provided between armature 12 and the respective stator cores 10 and 11 to return the armature to a centered position with relation to the stator.

FIG. 4 differs from the structure shown in FIG. 3 in that the intermediate poles 51 and 52 of the armature are of the same character as that shown in FIGS. 1 and 2. Here, the reluctance of the second magnetic circuit changes with movement of the armature as the gap area between armature pole 51, core pole 27 either increases or decreases as the gap area between armature pole 52, core pole 29 either decreases or increases. The intermediate gaps provided in this embodiment are also force gaps. Where all four of the provided gaps in the magnetic circuits are force producing gaps, the actuator functions at its highest efficiency.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A magnetomotive actuator of a rectilinear output type comprising a stator, an armature supported to move translationally along an axis with relation to the stator, said stator including a first flux conducting core having axially spaced first and second end poles, a second flux conducting core having axially spaced third and fourth end poles, a member for oppositely polarizing the respective cores connecting the second and third end poles of the cores in axially spaced relation, said armature having respective terminal poles spaced from the respective first and fourth end poles of the stator cores by gaps to provide a first polarized magnetic circuit with the cores and member and having intermediate poles spaced from the respective second and third end poles of the stator cores by gaps to provide a second polarized magnetic circuit with the cores and member, and electrical input means including windings for the first and second cores providing oppositely directed flux fiields in the first core and armature and second core and armature, one of which supplements the polarizing flux at one of the end terminal gaps of the first magnetic circuit and opposes the polarizing flux of the second magnetic circuit at the intermediate gap of the core with the pole related to the one gap of the first magnetic circuit, and the other of which opposes the polarizing flux at the other of the terminal gaps of the first magnetic circuit and supplements the polarizing flux of the second magnetic circuit at the intermediate gap of the core with the pole related to the other gap of the first magnetic circuit to move the armature.

2. An actuator of the character claimed in claim 1, in which the arranged gaps between the related core poles and the armature poles are concentric to the axis, and the total reluctance of the magnetic circuits remains constant as the armature moves from a centered position along its axis with relation to the stator.

3. An actuator of the character claimed in claim 1, in which the arranged gaps between the related core poles and the armature poles are concentric to the axis, the reluctance of the first magnetic circuit remains constant, and the reluctance of the second magnetic circuit changes as the armature moves along its axis with relation to the stator.

4. An actuator of the character claimed in claim 1, in which the terminal gaps between the related core poles and armature poles are normal to the axis and the intermediate gaps between the related core poles and armature poles are concentric to the axis, and the total reluctance of the magnetic circuits changes as the armature moves from a centered position between the core poles normal to the axis.

5. An actuator of the character claimed in claim 1, in which the terminal gaps between the related core poles and armature poles are normal to the axis and the intermediate gaps between the related core poles and armature poles are concentric to the axis, the reluctance of the second magnetic circuit remains constant, and the reluctance of the first magnetic circuit changes as the armature moves from a centered position between the core poles normal to the axis.

6. An actuator of the character claimed in claim 1, in which said member is a tubular permanent magnet concentric to the axis of the armature.

7. In a magnetomotive actuator of the rectilinear output type, a stator, an armature supported to move translationally along an axis with relation to the stator, said stator including a first flux conducting core having axially spaced first and second end poles, a spacing element extending parallel to the axis of the armature having oppositely polarized ends one of which is connected to the second end pole of the first core, a second flux conducting core having axially spaced third and fourth end poles whose third end pole is connected to the other end of the spacing element, said armature having respective terminal poles spaced from the respective first and fourth end poles by gaps to provide a first polarized magnetic circuit with the cores and spacing element and having intermediate poles spaced from the respective second and third end poles by gaps to provide a second polarized magnetic circuit with the cores and spacing element.

8. A magnetomotive actuator of the rectilinear output type comprising a stator, an armature supported to move translationally along an axis with relation to the stator, said stator including a first electromagnet with a coil and a core of E-shaped axial cross section whose central leg provides a first end pole normal to the axis and whose outer leg provides a first end pole concentric to the axis, a spacing element extending parallel to the axis of the armature having oppositely polarized ends one of which is connected to the outer leg of the core of the first electromagnet, a second electromagnet with a coil and a core of E-shaped axial cross section whose central leg provides a second end pole normal to the axis and whose outer leg provides a second end pole concentric to the axis that is connected to the other end of the polarized spacing element, said armature having respective terminal poles spaced from the respective end poles of the cores normal to the axis by gaps to provide a first magnetic circuit with the cores and spacing element and having axially spaced intermediate poles spaced from the respective end poles of the cores concentric to the axis by gaps to provide a second magnetic circuit with the cores and spacing element, and means for exciting the respective coils of the electromagnets differentially to translate the armature along its axis with relation to the stator.

9. In a magnetomotive actuator of the rectilinear output type, a stator and an axially movable magnetic armature having axially spaced end poles and intermediate poles, said stator including an annular flux conductive member concentric to the axis of the armature having oppositely polarized ends, a first electromagnet with a magnetic core having axially spaced poles connected to one end of the member arranged in gap relation to one of the end poles and intermediate poles of the armature, and a second electromagnet with a magnetic core having axially spaced poles connected to the other end of the member arranged in gap relation to the other of the end and intermediate poles of the armature.

10. An actuator of the character claimed in claim 9 in which said annular member is a permanent magnet.

11. In a magnetomotive actuator of the rectilinear output type, a stator and an axially movable magnetic armature having axially spaced end poles and intermediate poles, said stator including a pair of electromagnets with magnetic cores of E-shaped axial cross section, the center legs of which provide oppositely arranged end poles normal to the axis located in gap relation to the respective end armature poles and the outer legs of which provide axially spaced poles concentric to the axis located in gap relation to the respective intermediate armature poles, and a tubular permanent magnet with oppositely polarized ends connected at one of its ends to one of the outer core legs and connected at the other of its ends to the other of the outer core legs.

References Cited in the file of this patent

UNITED STATES PATENTS

| | | |
|---|---|---|
| 458,872 | Depoele | Sept. 1, 1891 |
| 1,678,278 | Weyandt | July 24, 1928 |
| 1,745,503 | Parvin | Feb. 4, 1930 |
| 2,427,898 | Burrows | Sept. 23, 1947 |
| 2,447,230 | Brown | Aug. 17, 1948 |
| 2,769,103 | Kristiansen | Oct. 30, 1956 |
| 2,938,269 | Nissen | May 31, 1960 |

FOREIGN PATENTS

| | | |
|---|---|---|
| 245,443 | Italy | Mar. 29, 1926 |
| 1,057,180 | France | Apr. 13, 1955 |